United States Patent
Wong et al.

(10) Patent No.: US 9,025,269 B1
(45) Date of Patent: May 5, 2015

(54) DISK DRIVE COMPENSATING FOR CYCLE SLIP OF DISK LOCKED CLOCK WHEN READING MINI-WEDGE

(71) Applicant: Western Digital Technologies, Inc., Irvine, CA (US)

(72) Inventors: Richard K. Wong, San Jose, CA (US); Sanghoon Chu, San Jose, CA (US); Guoxiao Guo, Irvine, CA (US); Jack M. Chue, Los Altos, CA (US); Carl E. Barlow, Lake Forest, CA (US); Wei Guo, Fremont, CA (US); Michael Chang, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/152,129

(22) Filed: Jan. 10, 2014

Related U.S. Application Data

(60) Provisional application No. 61/922,996, filed on Jan. 2, 2014.

(51) Int. Cl.
*G11B 5/09* (2006.01)
*G11B 5/596* (2006.01)

(52) U.S. Cl.
CPC .................................. *G11B 5/59688* (2013.01)

(58) Field of Classification Search
None
See application file for complete search history.

(56) References Cited

U.S. PATENT DOCUMENTS

| | | | |
|---|---|---|---|
| 5,311,376 A | 5/1994 | Joan et al. | |
| 5,377,058 A | 12/1994 | Good et al. | |
| 5,784,219 A | 7/1998 | Genheimer | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |

(Continued)

*Primary Examiner* — Regina N Holder
*Assistant Examiner* — Mark Fischer

(57) ABSTRACT

A disk drive is disclosed comprising a head actuated over a disk comprising a plurality of servo tracks defined by full sectors and intervening short servo sectors, where each full servo sector comprises a preamble, a sync mark, and servo bursts, and each short servo sector comprises a reference pattern and servo bursts. A first phase error is generated based on the sync mark in a first full servo sector, and a disk locked clock is adjusted in response to the first phase error. A second phase error is generated based on the reference pattern in a first short servo sector, and the second phase error is processed to determine whether the disk locked clock slipped a cycle before the head reaching the first short servo sector.

18 Claims, 4 Drawing Sheets

(56) References Cited

U.S. PATENT DOCUMENTS

| | | | |
|---|---|---|---|
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,388,829 B1 | 5/2002 | Nazarian |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,501,606 B2 | 12/2002 | Boutaghou et al. |
| 6,507,450 B1 | 1/2003 | Elliott |
| 6,519,102 B1 | 2/2003 | Smith et al. |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,205 B1 * | 5/2004 | Moran et al. ............... 360/17 |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,038,875 B2 | 5/2006 | Lou et al. |
| 7,046,465 B1 | 5/2006 | Kupferman |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,449 B2 | 6/2006 | Riddering et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,984 B1 | 8/2007 | Patapoutian et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,324,299 B1 | 1/2008 | Schreck et al. |
| 7,330,019 B1 | 2/2008 | Bennett |
| 7,330,324 B2 | 2/2008 | Morinaga et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,369,340 B1 | 5/2008 | Dang et al. |
| 7,388,728 B1 | 6/2008 | Chen et al. |
| 7,391,583 B1 | 6/2008 | Sheh et al. |
| 7,391,584 B1 | 6/2008 | Sheh et al. |
| 7,423,830 B2 | 9/2008 | Ma et al. |
| 7,426,090 B2 | 9/2008 | Yamashita et al. |

(56) References Cited

U.S. PATENT DOCUMENTS

| | | | |
|---|---|---|---|
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,854 B2 | 12/2008 | Yamashita et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,135 B1 | 5/2010 | Sutardja et al. |
| 7,715,138 B1 | 5/2010 | Kupferman |
| 7,719,781 B2 | 5/2010 | Ehrlich et al. |
| 7,724,464 B2 | 5/2010 | Kisaka et al. |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,835,104 B2 | 11/2010 | Yamashita et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,880,992 B2 | 2/2011 | Ozturk et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,986,487 B1 | 7/2011 | Madden et al. |
| 7,995,304 B2 | 8/2011 | Ozturk et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,054,573 B2 | 11/2011 | Mathew et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,295,002 B1 * | 10/2012 | Katchmart ...................... 360/48 |
| 8,300,348 B1 | 10/2012 | Liu et al. |
| 8,300,349 B2 | 10/2012 | Mathew et al. |
| 8,315,005 B1 | 11/2012 | Zou et al. |
| 8,315,007 B1 | 11/2012 | Sutardja et al. |
| 8,320,069 B1 | 11/2012 | Knigge et al. |
| 8,325,432 B2 | 12/2012 | Mathew et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,462,454 B1 | 6/2013 | Katchmart |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |

(56) References Cited

U.S. PATENT DOCUMENTS

| | | |
|---|---|---|
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2003/0043491 A1 | 3/2003 | Riddering et al. |
| 2006/0056091 A1 | 3/2006 | Nagano et al. |
| 2007/0230014 A1 | 10/2007 | Yamashita et al. |
| 2007/0230015 A1 | 10/2007 | Yamashita et al. |
| 2007/0268615 A1 | 11/2007 | McFadyen et al. |
| 2008/0130159 A1 | 6/2008 | Dieron et al. |
| 2008/0165443 A1 | 7/2008 | Moline |
| 2008/0165446 A1 | 7/2008 | Partee |
| 2009/0153996 A1 | 6/2009 | Ellis |
| 2010/0035085 A1 | 2/2010 | Jung et al. |
| 2010/0128386 A1 | 5/2010 | Keizer et al. |
| 2010/0169730 A1* | 7/2010 | Kimura .................. 714/746 |
| 2012/0284493 A1 | 11/2012 | Lou et al. |
| 2013/0120870 A1 | 5/2013 | Zhou et al. |
| 2013/0148240 A1 | 6/2013 | Ferris et al. |

\* cited by examiner

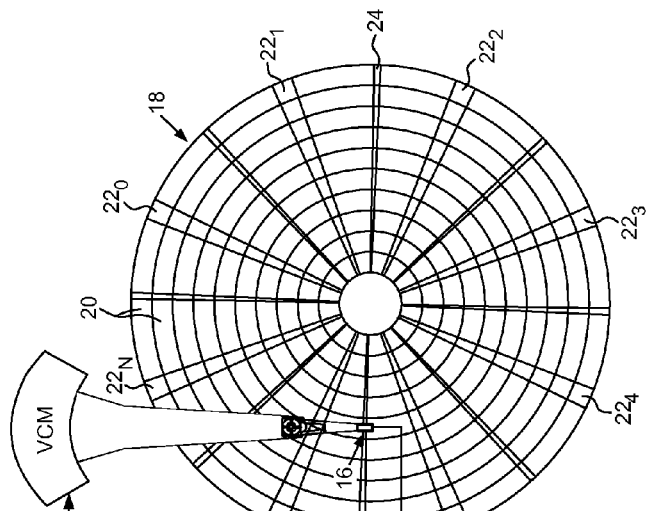
FIG. 2A
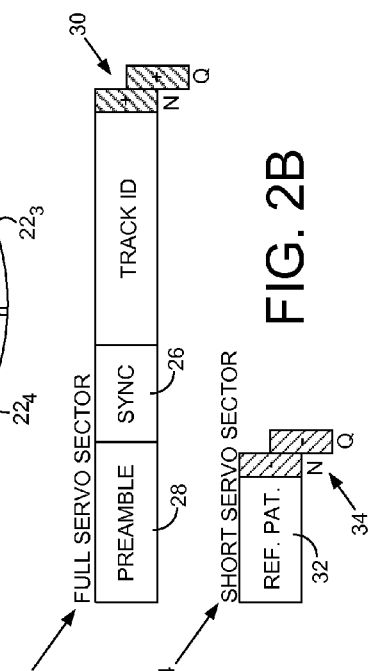
FIG. 2B
FIG. 2C
FIG. 2D
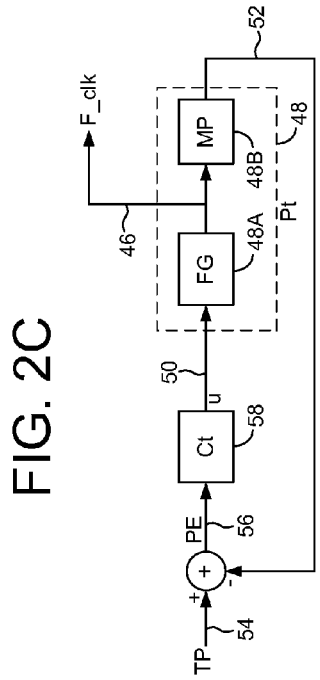

DISK DRIVE COMPENSATING FOR CYCLE SLIP OF DISK LOCKED CLOCK WHEN READING MINI-WEDGE

CROSS-REFERENCE TO RELATED APPLICATION

This application claims priority to provisional U.S. Patent Application Ser. No. 61/922,996, filed on Jan. 2, 2014, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a disk drive according to an embodiment comprising a head actuated over a disk comprising full servo sectors and short servo sectors.

FIG. 2B shows an embodiment wherein each full servo sector comprises a sync mark whereas each short servo sector does not comprise a sync mark.

FIG. 2C shows a flow diagram according to an embodiment wherein a disk locked clock is adjusted based on a first phase error generated by reading the sync marks in the full servo sectors and based on a second phase error generated by reading a reference pattern in the short servo sectors.

FIG. 2D shows a timing recovery system according to an embodiment for generating the disk locked clock based on the first phase error generated by reading the sync marks in the full servo sectors.

DETAILED DESCRIPTION

Figure 1:
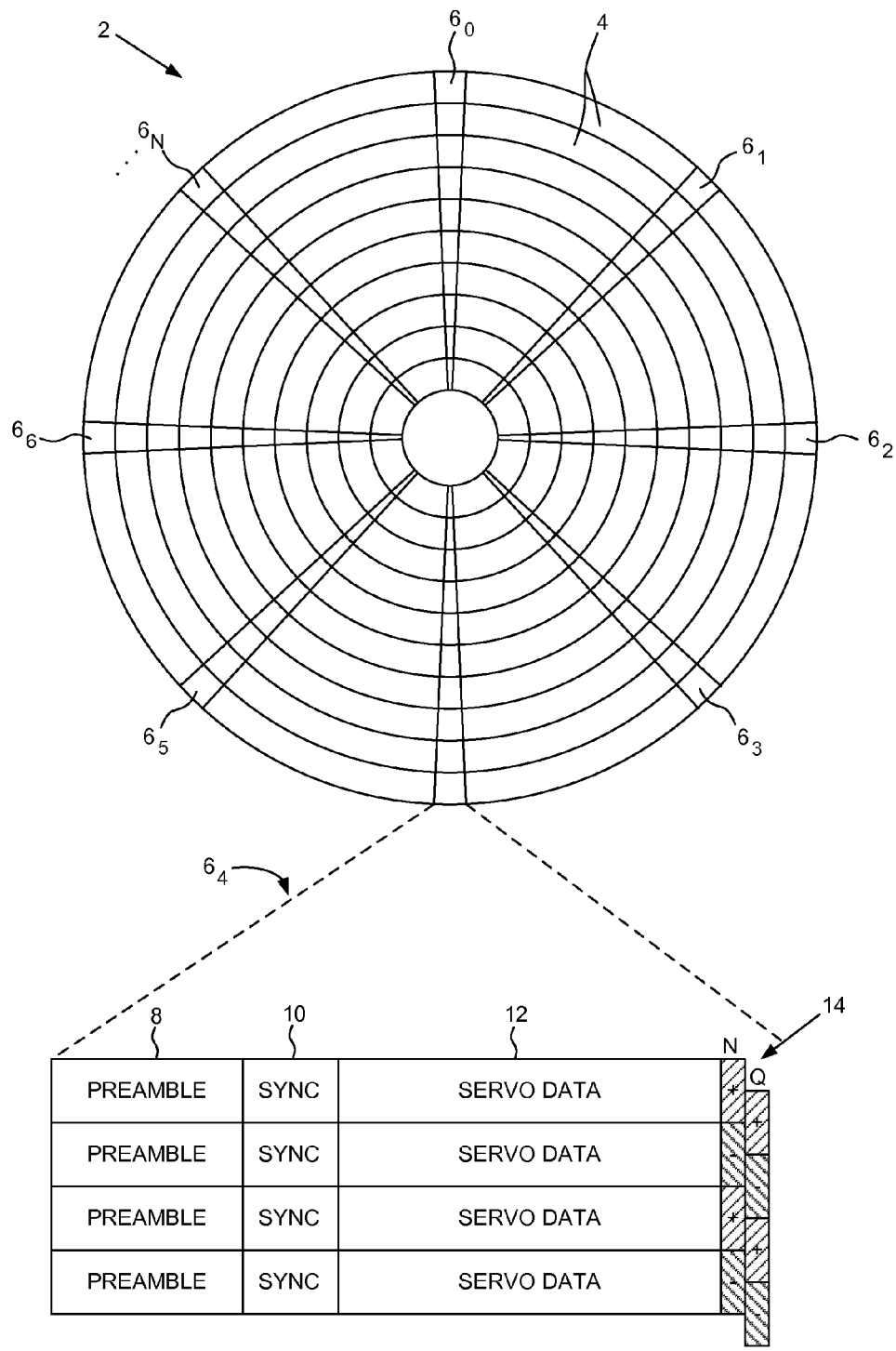
FIG. 1 shows a prior art disk format comprising a plurality of servo tracks defined by servo sectors.

FIG. 2A shows a disk drive according to an embodiment comprising a head 16 actuated over a disk 18 comprising a plurality of servo tracks 20 defined by full sectors $22_0$-$22_N$ and intervening short servo sectors (e.g., short servo sector 24), where FIG. 2B shows each full servo sector 22 comprises a sync mark 26, a preamble 28, and servo bursts 30, and each short servo sector 24 comprises a reference pattern 32 and servo bursts 34. The disk drive further comprises control circuitry 36 operable to execute the flow diagram of FIG. 2C, wherein a first phase error is generated based on the sync mark in a first full servo sector (block 38), and a disk locked clock is adjusted in response to the first phase error (block 40). A second phase error is generated based on the reference pattern in a first short servo sector (block 42), and the second phase error is processed to determine whether the disk locked clock slipped a cycle before the head reaching the first short servo sector (block 44).

FIG. 2D shows a timing recovery system according to an embodiment comprising a timing plant 48 for generating a disk locked clock 46. In the embodiment of FIG. 2D, the plant 48 comprises a frequency generator 48A for generating the disk locked clock 46 at a frequency based on an input control signal 50. The timing plant 48 further comprises a block 48B for measuring a phase 52 of the disk locked clock 46 relative to a rotation speed of the disk 18. The measured phase 52 is subtracted from a target phase 54 to generate a phase error 56. A suitable compensator 58 filters the phase error 56 to generate the control signal 50 applied to the frequency generator 48A, thereby adjusting the disk locked clock 46 so as to be synchronized with the rotation speed of the disk 18.

The phase 52 of the disk locked clock 46 relative to the rotation speed of the disk may be measured in any suitable manner. In one embodiment, the disk locked clock 46 is used to clock a counter which counts an integer number of clock cycles between the sync marks 26 in each of the full servo sectors 22. In addition, the preamble 28 of a full servo sector 22 may be sampled using the disk locked clock 46 in order to measure a fractional phase of the disk locked clock 46 by, for example, computing a Discrete Fourier Transform (DFT). If the disk locked clock 46 is exactly synchronized to the rotation speed of the disk 18, the integer number of clock cycles between the sync marks 26 of consecutive full servo sectors will match a target integer, and the fractional phase when sampling the preamble 28 will match a target fraction (e.g., zero). However, imperfections in the spindle motor that rotates the disk 18 as well as other factors, such as eccentricity of the servo tracks 20, will cause the rotation speed of the disk 18 relative to the head 16 to vary as the disk 18 rotates, thereby inducing a phase error 56 in the timing recovery system of FIG. 2D.

In one embodiment, the sampling frequency of the phase error 56 in the timing recovery system affects the ability to accurately synchronize the disk locked clock 46 to within an acceptable error. Accordingly, in order to improve the performance of the timing recovery system and/or in order to abort a write operation due to a substantial disturbance to the disk drive (e.g., a physical shock), the phase error of the disk locked clock 46 may be updated when reading one of the short servo sectors 24 shown in FIG. 2B. In one embodiment, the short servo sector 24 is recorded without a sync mark so as to improve the format efficiency, and therefore only a fractional phase of the disk locked clock 46 may be measured by reading the reference pattern 32. However, if the disk locked clock 46 slips a full cycle before the head 16 reaches the short servo sector 24, the fractional phase may be measured incorrectly.

Figure 3A:
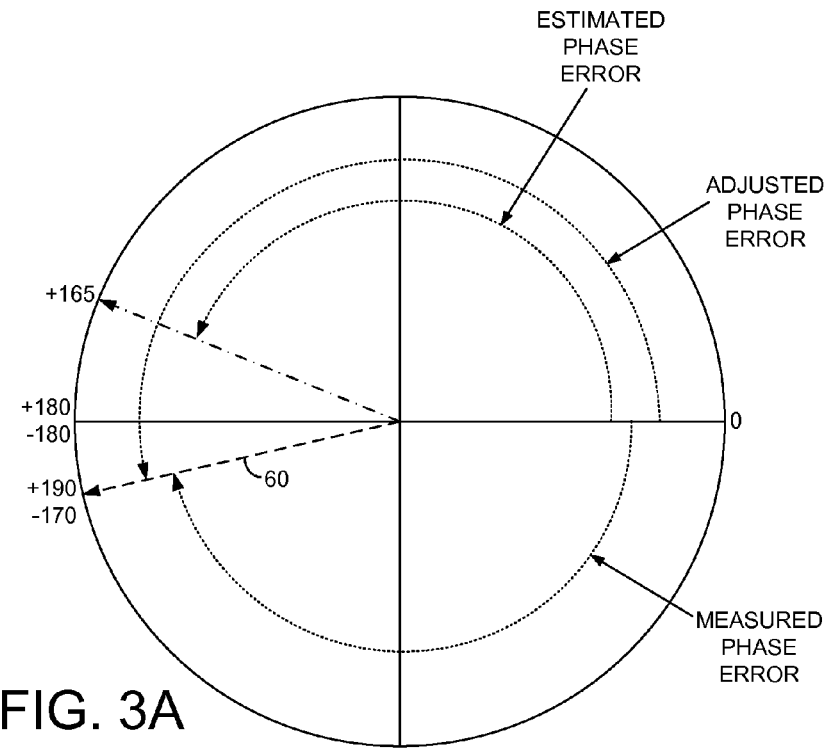
FIGS. 3A and 3B illustrate an embodiment wherein the second phase error is processed to determine whether the disk locked clock slipped a cycle before the head reaching a short servo sector.
Figure 3B:
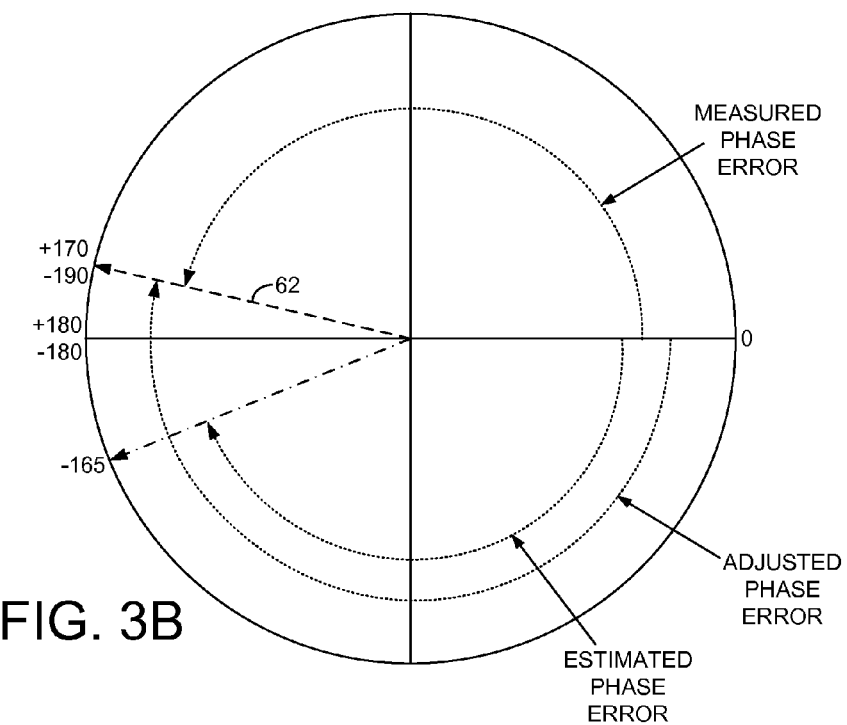

FIG. 3A shows an example where the target fractional phase is zero and the actual fractional phase error 60 at the short servo sector exceeds +180 degrees due to the disk locked clock 46 having a positive cycle slip, thereby causing the measured phase error to become negative (e.g., −170 degrees instead of +190 degrees). FIG. 3B illustrates the opposite example where the actual fractional phase error 62 at the short servo sector exceeds −180 due to the disk locked clock 46 having a negative cycle slip, thereby causing the measured phase error to become positive (e.g., +170 degrees instead of −190 degrees). Accordingly, in one embodiment the phase error measured at a short servo sector is processed to determine whether the disk locked clock 46 slipped a cycle before the head 16 reached the short servo sector.

Figure 4:
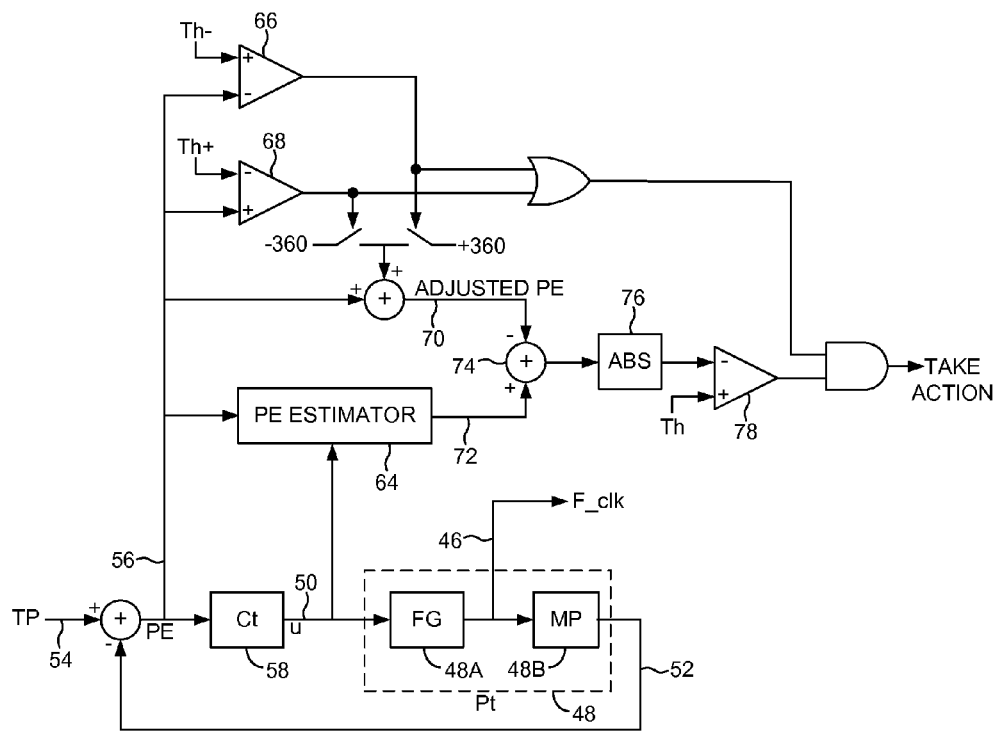
FIG. 4 illustrates an embodiment wherein the second phase error generated by reading the reference pattern in a short servo sector is adjusted by −360 or +360 degrees depending on the polarity of the second phase error.

FIG. 4 shows an example embodiment for processing the phase error 56 measured at a short servo sector. In this embodiment, the timing recovery system comprises a suitable phase error estimator 64 which processes the previously generated phase error 56 and the control signal 50 in order to estimate the phase error when the head 16 reaches a short servo sector. If the phase error measured at the short servo sector (by reading the reference pattern 32) is less than a negative threshold at comparator 66, it means there is a chance of a positive cycle slip by the disk locked clock 46 as illustrated in FIG. 3A. Accordingly, the measured phase error 56 is adjusted by adding 360 degrees to convert the negative phase error into an equivalent positive phase error as shown in FIG. 3A. Conversely, if the phase error measured at the short servo sector (by reading the reference pattern 32) is greater than a positive threshold at comparator 68, it means there is a chance of a negative cycle slip by the disk locked clock 46 as illustrated in FIG. 3B. Accordingly, the measured phase error 56 is adjusted by subtracting 360 degrees to convert the positive phase error into an equivalent negative phase error as shown in FIG. 3B. The adjusted phase error 70 is compared to the estimated phase error 72 (by computing a subtraction 74 and absolute value 76), and when the comparison is less than a threshold at comparator 78, a cycle slip of the disk locked clock 46 is detected. That is, when the adjusted phase error is close to the estimate phase error within a predetermined margin, it is assumed the disk locked clock 46 slipped a cycle.

Any suitable action may be taken when a cycle slip of the disk locked clock 46 is detected at a short servo sector, such as aborting a write operation. That is, a cycle slip may be caused by a substantial disturbance such as a physical shock to the disk drive during a write operation. A physical shock that induces a cycle slip of the disk locked clock 46 may also cause the head 16 to deviate away from the center of the target track causing an off-track write condition. Accordingly, when a cycle slip is detected during a write operation while the head is between full servo sectors, a write operation may be aborted sooner so as to avoid corrupting data recorded in adjacent tracks (as compared to delaying the write abort until the next full servo sector is reached).

Figure 5:
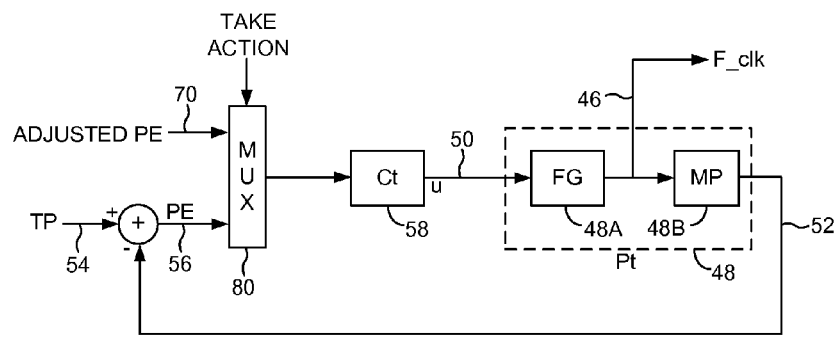
FIG. 5 shows a timing recovery system according to an embodiment wherein when the adjusted second phase error indicates the disk locked clock slipped a cycle, the adjusted second phase error is used to adjust the disk locked clock.

In another embodiment illustrated in FIG. 5, when a cycle slip of the disk locked clock is detected at a short servo sector, the adjusted phase error 70 may be selected (by configuring multiplexer 80) as the phase error input into the compensator 58. Adjusting the disk locked clock 46 based on the adjusted phase error 70 rather than the measured phase error 56 avoids the transient that would otherwise be introduced into the timing recovery system, while still improving the timing recovery performance by providing at least one extra phase error sampling between full servo sectors.

Although the embodiment of FIG. 2A shows a single short servo sector between consecutive full servo sectors, other embodiments may employ two or more short servo sectors, wherein a phase error for the disk locked clock may be measured at each short servo sector. In addition, any suitable format may be employed for the full servo sectors as well as the short servo sectors as compared to the embodiment shown in FIG. 2B. For example, one or more of the short servo sectors 24 may comprise additional fields that may precede or follow the servo bursts 34. For example, a field following the servo bursts 34 may comprise additional servo information, such as a partial track ID and/or compensation values that compensate for a repeatable runout (RRO) of the disk 18.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a disk comprising a plurality of servo tracks defined by full sectors and intervening short servo sectors, where each full servo sector comprises a preamble, a sync mark, and servo bursts, and each short servo sector comprises a reference pattern and servo bursts;
   a head; and
   control circuitry configured to:
      generate a first phase error based on the sync mark in a first full servo sector;
      adjust a disk locked clock in response to the first phase error;
      generate a second phase error based on the reference pattern in a first short servo sector; and
      process the second phase error to determine whether the disk locked clock slipped a cycle before the head reaching the first short servo sector.

2. The disk drive as recited in claim 1, wherein the control circuitry is further configured to adjust the second phase error to generate an adjusted phase error.

3. The disk drive as recited in claim 2, wherein the control circuitry is further configured to synchronize the disk locked clock in response to the adjusted phase error.

4. The disk drive as recited in claim 2, wherein the control circuitry is further configured to abort a write operation in response to the adjusted phase error.

5. The disk drive as recited in claim 2, wherein the control circuitry is further configured to:
   generate an estimated phase error corresponding to the second phase error; and
   compare the estimated phase error to the adjusted phase error.

6. The disk drive as recited in claim 5, wherein the control circuitry is further configured to adjust the disk locked clock in response to the adjusted phase error when the comparison is less than a threshold.

7. The disk drive as recited in claim 5, wherein the control circuitry is further configured to abort a write operation when the comparison is less than a threshold.

8. The disk drive as recited in claim 1, wherein the control circuitry is further configured to process the second phase error by comparing the second phase error to a threshold.

9. The disk drive as recited in claim 1, wherein the control circuitry is further configured to:
   adjust the second phase error by adding 360 degrees to the second phase error when the second phase error is negative; and
   adjust the second phase error by subtracting 360 degrees from the second phase error when the second phase error is positive.

10. A method of operating a disk drive comprising a head and a disk comprising a plurality of servo tracks defined by full sectors and intervening short servo sectors, where each full servo sector comprises a preamble, a sync mark, and servo bursts, and each short servo sector comprises a reference pattern and servo bursts, the method comprising:
    generating a first phase error based on the sync mark in a first full servo sector;
    adjusting a disk locked clock in response to the first phase error;
    generating a second phase error based on the reference pattern in a first short servo sector; and
    processing the second phase error to determine whether the disk locked clock slipped a cycle before the head reaching the first short servo sector.

11. The method as recited in claim 10, further comprising adjusting the second phase error to generate an adjusted phase error.

12. The method as recited in claim 11, further comprising synchronizing the disk locked clock in response to the adjusted phase error.

13. The method as recited in claim 11, further comprising aborting a write operation in response to the adjusted phase error.

14. The method as recited in claim 11, further comprising:
    generating an estimated phase error corresponding to the second phase error; and
    comparing the estimated phase error to the adjusted phase error.

15. The method as recited in claim 14, further comprising adjusting the disk locked clock in response to the adjusted phase error when the comparison is less than a threshold.

16. The method as recited in claim 14, further comprising aborting a write operation when the comparison is less than a threshold.

17. The method as recited in claim 10, further comprising processing the second phase error by comparing the second phase error to a threshold.

18. The method as recited in claim 10, further comprising:
    adjusting the second phase error by adding 360 degrees to the second phase error when the second phase error is negative; and
    adjusting the second phase error by subtracting 360 degrees from the second phase error when the second phase error is positive.

* * * * *